United States Patent [19]
Lyon

[11] 3,764,637
[45] Oct. 9, 1973

[54] THERMAL ALKYLATION WITH LOW PARAFFIN TO ETHYLENE MOLE RATIO

[75] Inventor: Richard K. Lyon, Fanwood, N.J.

[73] Assignee: Esso Research and Engineering Company, Linden, N.J.

[22] Filed: Apr. 13, 1971

[21] Appl. No.: 133,758

[52] U.S. Cl. .................... 260/683.47, 260/683.4 R
[51] Int. Cl. ............................................. C07c 3/50
[58] Field of Search ................. 260/683.43, 683.58, 260/683.47, 683.4 R

[56] References Cited
UNITED STATES PATENTS
2,410,107  10/1946  Sachanen et al. ............... 260/683.47
2,423,401  7/1947  O'Kelly et al. ............... 260/683.4 R
2,202,115  5/1940  Morrell .......................... 260/683.43
3,338,908  8/1967  Franz et al. .................. 260/683.4 R FOREIGN PATENTS OR APPLICATIONS
824,553  12/1959  Great Britain ................. 260/683.43

Primary Examiner—Delbert E. Gantz
Assistant Examiner—G. J. Crasanakis
Attorney—Chasan and Sinnock and John Paul Corcoran

[57] ABSTRACT

Thermal alkylation reaction of straight and branched-chain paraffins with ethylene is carried out in the presence of HCl at low paraffin to olefin mole ratio of about 3 to about 0.5. In a preferred embodiment, isobutane is condensed with ethylene to yield 2,2-dimethyl butane.

3 Claims, No Drawings

THERMAL ALKYLATION WITH LOW PARAFFIN TO ETHYLENE MOLE RATIO

FIELD OF THE INVENTION

This invention relates to the use of hydrogen atom transfer catalysts in thermal alkylation processes. More particularly, this invention relates to the production of paraffins having improved high octane ratings by thermal alkylation reactions utilizing hydrogen atom transfer catalysts. In a preferred embodiment, isobutane is concensed with ethylene in the presence of HCl as a hydrogen atom transfer catalyst to yield 2,2-dimethyl butane.

PRIOR ART

It is known in the art that paraffins may be condensed with olefins to yield higher molecular weight branched chain paraffins under both thermal and catalytic conditions.

Thermal alkylation takes place in the gas phase and requires high temperatures (up to 500°C) and pressures (up to 300 atmospheres) to achieve adequate yields. Catalytic alkylation takes place under less stringent conditions, i.e., temperatures ranging from −30° to 100°C according to the catalyst, and pressures sufficient to keep the reactants in the liquid phase. The catalysts used in catalytic alkylation include $AlCl_3$, $AlBr_3$, $ZrCl_2$, $BF_3$, HF and $H_2SO_4$.

Thermal alkylation differs markedly from catalytic alkylation in several important respects. Various straight chain paraffins, including propane, butane and higher straight and branched chain paraffins, can be alkylated thermally. On the other hand, only paraffins containing tertiary carbon atoms can be alkylated catalytically. Thermal alkylation takes place more readily with ethylene, followed by propylene, butylene and isobutylene in that order. In catalytic alkylation the reverse order of activity occurs.

The reaction products of thermal and catalytic alkylation differ. For example, in the case of the alkylation of isobutane with ethylene, 2,2-dimethyl butane is the chief product formed by the thermal alkylation process, while the catalytic alkylation process produces mainly 2,3-dimethyl butane. The 2,2 isomer is more valuable as a motor fuel since it would have a higher antiknock value than the 2,3 isomer. The high temperatures and pressures required by the thermal alkylation process have heretofore made this process unattractive for the production of motor fuel. A further drawback to the thermal alkylation process for producing high antiknock fuel by the alkylation of isobutane with ethylene is the requirement of large excesses of isobutane to decrease the concentration of ethylene polymerization products.

Ridgeway, in an article published in Industrial Engineering Chemistry, 50, 1531 (1958), discloses the use of small amounts of hydrogen halides and compounds that break down to yield hydrogen halides in a thermal alkylation process. In Ridgeway's preferred process ethyl bromide was used. Ridgeway's process is characterized as producing an alkylate fraction containing at least 30 percent of the $C_8$ alkylate, which is known in the art to be substantially lower octane value than the preferred $C_6$ alkylate product.

SUMMARY OF THE INVENTION

It has now been unexpectedly discovered that an improved thermal alkylation process results when said alkylation process is carried out in the presence of a hydrogen atom transfer catalyst. Said improvement comprises increasing the yield of alkylate and upgrading the alkylate product isomer distribution. The hydrogen atom transfer catalysts utilized in the process of this invention are selected from the group consisting of HCl, $H_2S$, RSH,

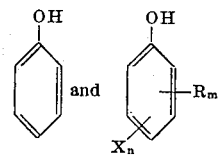

wherein R is selected from the group consisting of $C_1$ to $C_{20}$ alkyl, $C_6$ to $C_{20}$ aryl, $C_3$ to $C_{20}$ cycloalkyl, $C_2$ to $C_{20}$ alkenyl, $C_7$ to $C_{20}$ aralkyl and $C_7$ to $C_{20}$ alkaryl radicals. X is selected from the group consisting of halogen, nitro, cyano, and sulfono, and n and m are positive integers varying from 0 to 5. The hydrogen atom transfer catalyst is preferably HCl, $H_2S$, methyl mercaptan or phenol with HCl most preferred.

The hydrogen atom transfer catalyst will be utilized in the thermal alkylation process upon a mole ratio based on the olefin present of at least 0.01. Preferably the mole ratio of hydrogen atom transfer catalyst to olefin is from about 0.1 to 10, with the ratio of 0.1 to 2 most preferred.

In the thermal alkylation process of the instant invention a saturated hydrocarbon is contacted with an olefin at thermal alkylating conditions in the presence of a hydrogen atom transfer catalyst to yield an alkylate product. The saturated hydrocarbon is chosen according to the nature of the product desired. For the production of motor fuel, ethane, propane, n-butane, isobutane, n-pentane, isopentane, hexane, 2-methyl pentane and 3-methyl pentane are useful, with isobutane and isopentane preferred, and isobutane most preferred. For the production of lube oil, any feedstock containing a large percentage of $C_{20}$ to $C_{50}$ normal and slightly branched paraffins may be used, but slack wax and high wax crudes are preferred.

The olefin is selected from the group consisting of $C_2$ through $C_6$ olefins, preferably ethylene, propylene and/or isobutylene, with ethylene most preferred.

In the preferred process of the instant invention isobutane is contacted with ethylene at thermal alkylating conditions in the presence of HCl. The mole ratio of isobutane to ethylene may vary from 10 to 0.5, preferably from about 3 to 0.5. One of the advantages of the instant process for alkylating isobutane with ethylene is that a mole ratio of isobutane to ethylene of less than about 4 may be utilized, unlike the prior art processes which require up to 70. In the prior art this requirement was met by adding the isobutane at the start of reaction and adding the ethylene in stages throughout the course of the reaction. In this manner, the ethylene is being used up as fast as it is added, thus keeping the ratio of isobutane to ethylene in the reactor high. This procedure still requires massive isobutane recirculation. In the instant invention the hydrogen atom transfer catalyst eliminates the need to use these clumsy and expensive methods.

The mole ratio of HCl to ethylene will be at least 0.01, preferably from about 0.01 to 10, with a mole ratio of from about 0.1 to 2 most preferred.

In a thermal alkylation process, wherein a paraffin is condensed with an olefin, various products are formed including those derived from olefin self-condensation as well as those derived from the condensation of the paraffin with one or more molecules of olefin. The latter product is the desired alkylate. The instant invention provides a means for increasing the yield of alkylate at the expense of olefin self-condensation products. The process of the instant invention further provides a method for increasing the fraction of the alkylate resulting from the condensation of a single olefin molecule with the paraffin as well as a method for controlling the site on the paraffin at which the olefin is added. The means for maximizing the yield of mono-olefin alkylate while minimizing di-olefin and higher alkylate and olefin self-condensation products is provided by the addition of the above-mention hydrogen atom transfer catalysts in the amounts described. The means of controlling the position on the paraffins, i.e., primary, secondary and tertiary, at which olefin is added is in the choice of hydrogen atom transfer catalyst, and the concentration in which it is used.

An HCl-olefin mole ratio of from about 0.01 to about 0.05 will increase the relative amounts of olefin addition at the primary position of the paraffin. HCl-olefin mole ratios of from 0.04 to 10 will favor the formation of proudcts resulting from the addition of olefin at a tertiary position.

The use of $H_2S$ as a hydrogen atom transfer catalyst in a mole ratio of from about 0.01 to 10 based on olefin, favors the formation of products resulting from the addition of olefin at the tertiary position.

The thermal alkylation process of the instant invention takes place at a temperature of from about 100°C to 700°C, preferably 100° to 650°C, and most preferably 100° to 600°C. The pressure range for the thermal alkylation process will vary from 15 psi to 5,000 psi, preferably 30 psi to 4,000 psi, and most preferably 100 psi to 3,000 psi. The contact time for the isobutane and ethylene reactants will vary from 1 second to 10 hours, preferably 5 seconds to 5 hours. It is noted that the reaction conditions chosen will affect both the rate of reaction and the product yield. For example, at 100°C and 100 psi no reaction at all occurs unless free radical initiators such as gamma radiation, ultraviolet light, ditertiary butyl peroxide, etc. are used. At 400°C and 1,600 psi the reaction goes well without initiators, nearly complete ethylene consumption being achieved in one hour. The skilled artisan, of course, will be able to choose the reaction conditions needed to obtain the optimum product with his individual equipment.

The thermal alkylation process of the instant invention may be carried out both batchwise and continuously. The equipment used for carrying out the process of the instant invention will be obvious to the skilled artisan and includes a vessel capable of withstanding the desired reaction temperature and pressure, provisions for adding the reactants and the hydrogen atom transfer catalyst to said vessel, provisions for removing the reaction products from said vessel and provision for separating the reaction products from unreacted reactants and the hydrogen atom transfer catalyst and recirculating the latter.

The following are specific embodiments of the instant process.

EXAMPLE 1

Thermal Alkylation of Isobutane and Ethylene in the Presence of HCl

A mixture comprising 9.97 mole % methane as an internal standard, 29.7% ethylene and 60.3% isobutane was reacted at thermal alkylation conditions in the presence of varying amounts of HCl. The procedure used was as follows. A 20 cc Nichrome vessel was cooled to liquid nitrogen temperature and a measured amount of the desired reaction mixture was condensed into it. Said reaction mixture comprised the above-described hydrocarbon mixture with or without various amounts of HCl. After condensing the reaction mixture into the vessel, the valve on top of the vessel was closed and the vessel was heated to 160°C overnight. This was done to insure that the reaction mixture was homogeneous. After this treatment the vessel was heated to 400°C for 30 minutes. From the known vessel volume and known amount of hydrocarbon mixture charged, the hydrocarbon pressure was calculated to be 1,600 psi at a reaction temperature of 400°C. After 30 minutes, the products were recovered and analyzed by gas chromatography using a silica-gel column suitable for resolving $C_1$ to $C_8$ hydrocarbons. The results are given in Table I. Table I also shows the selectivity of the reaction which is defined as the ratio of ethylene contained in the alkylate to total ethylene consumed.

Note that the selectivity is greatly increased with amounts of HCl that are at least a factor of 10 higher than would be present in the prior art process of Ridgeway. Also, as will be disclosed in Table II, HCl in the range utilized by Ridgeway decreases the $C_6$ product quality.

In all the following tables the percentage of the hydrogen transfer catalyst is given in moles.

TABLE I

| Experiment number | Percent HCl | Moles/100 moles $C_2H_4$ | $C_2H_4/(C_2H_4)_o$ | $C_2H_6/(C_2H_4)_o$ | $C_3H_8/(C_2H_4)_o$ | $C_6H_{14}/(C_2H_4)_o$ | $C_6H_{18}/(C_2H_4)_o$ | Slectivity | $C_8H_{18}/C_6H_{14}+C_8H_{18}$ |
|---|---|---|---|---|---|---|---|---|---|
| 1 | 0 | 0 | .41 | .021 | .012 | .11 | .053 | .37 | .33 |
| 2 | 0 | 0 | .43 | .035 | .011 | .10 | .047 | .34 | .32 |
| 3 | .9 | 3.1 | .41 | .016 | .011 | .21 | .090 | .66 | .30 |
| 4 | 1.3 | 4.4 | .40 | .016 | .010 | .32 | .093 | .84 | .23 |
| 5 | 3.8 | 13.3 | .29 | .044 | .008 | .53 | .065 | .93 | .11 |
| 6 | 6.6 | 23.3 | .46 | .035 | .006 | .43 | .035 | .93 | .08 |
| 7 | 13 | 50 | .42 | .069 | .006 | .38 | .012 | .70 | .03 |
| 8 | 22.3 | 97 | .33 | .13 | .005 | .26 | 0 | .39 | .00 |

Example 2

Isomer Distribution of the Alkylate Product

A second series of experiments was run utilizing the same reaction mixture and reaction conditions as in Example 1 except that a high resolution gas chromatography column (DC 550 capillary) was used to obtain information on the exact isomer distribution. It was observed that the $C_8$ fraction consisted chiefly of 2,2-dimethyl hexane. The $C_6$ isomer distribution observed was as shown in Table II.

TABLE II

| Experiment No. | % HCl | *HCl/$C_2H_4$ | *2-Methyl Pentane/ 2-Methyl Pentane + 2,2-Dimethyl Butane |
|---|---|---|---|
| 9  | 0    | 0      | 0.13 |
| 10 | 0.08 | 0.0027 | 0.26 |
| 11 | 0.4  | 0.0135 | 0.24 |
| 12 | 3.8  | 0.133  | 0.19 |
| 13 | 5.1  | 0.181  | 0.15 |
| 14 | 16.6 | 0.238  | 0.098 |
| 15 | 9.   | 0.33   | 0.073 |
| 16 | 12.8 | 0.49   | 0.065 |

*Ratios are given in moles

Note the improvement in isomer distribution, i.e., increased selectivity to 2,2-dimethyl butane with increasing HCl.

EXAMPLE 3

Thermal Alkylation of Isobutane and Ethylene in the Presence of $H_2S$

The procedures of Example 1 were repeated except that $H_2S$ was used instead of HCl. The results are given in Table III.

TABLE III

| Experiment number | Percent $H_2S$ | $C_2H_4/(C_2H_4)_o$ | $C_2H_6/(C_2H_4)_o$ | $C_3H_8/(C_2H_4)_o$ | $C_6H_{14}/(C_2H_4)_o$ | $C_8H_{18}/(C_2H_4)_o$ | Selectivity | $C_8H_{18}/C_6H_{14}+C_8H_{18}$ |
|---|---|---|---|---|---|---|---|---|
| 57 | .048 | .40 | .026 | .011 | .12 | .051 | .37 | .30 |
| 28 | .11  | .39 | .025 | .011 | .14 | .065 | .44 | .32 |
| 19 | .33  | .37 | .029 | .010 | .12 | .061 | .38 | .34 |
| 10 | 1    | .43 | .039 | .006 | .13 | .061 | .44 | .32 |
| 11 | 2.9  | .26 | .094 | .004 | .29 | .05  | .53 | .12 |

What is claimed is:

1. A thermal alkylation process comprising contacting a saturated hydrocarbon selected from the group consisting of straight and branched chain paraffins, with ethylene, at thermal alkylating conditions in the presence of HCl, said HCl being present in a mole ratio, based on said olefin, of at least about 0.01 and where the mole ratio of saturated hydrocarbon to olefin ranges from about 3 to about 0.5.

2. A thermal alkylation process comprising contacting isobutane with ethylene at thermal alkylating conditions in the presence of HCl, said HCl being present in a mole ratio, based on said ethylene, of at least about 0.01 and where the mole ratio of isobutane to ethylene ranges from about 3 to about 0.5.

3. A thermal alkylation process comprising contacting isobutane and ethylene at a temperature ranging from about 100°C. to about 700°C., at a pressure ranging from about 15 psi to about 5,000 psi and for a time ranging from about 1 second to about 10 hours, in the presence of HCl, the mole ratio of HCl to ethylene varying between about 0.01 and 2 and the mole ratio of isobutane to ethylene ranging from about 3 to about 0.5.

* * * * *